United States Patent
Klinkhart et al.

[11] Patent Number: 5,915,337
[45] Date of Patent: Jun. 29, 1999

[54] INTERLOCKABLE PET COLLAR

[75] Inventors: Roger Dell Klinkhart, San Dimas; Herman O. Klinkhart, Upland; Kenneth W. Bowman, Diamond Bar, all of Calif.

[73] Assignee: Ejay International Inc., Glendora, Calif.

[21] Appl. No.: 08/658,160

[22] Filed: Jun. 4, 1996

[51] Int. Cl.⁶ .................................................. A01K 15/04
[52] U.S. Cl. .............................. 119/815; 119/856; 59/85
[58] Field of Search ................................. 119/815, 792, 119/814, 821, 855, 856, 863; 70/18, 49; 63/4; 59/85, 86

[56] References Cited

U.S. PATENT DOCUMENTS

| | | | |
|---|---|---|---|
| 54,889 | 5/1866 | Gardner | 70/18 |
| 180,518 | 8/1876 | Armentrout | 119/855 |
| 439,598 | 10/1890 | Huntoon et al. | 119/815 |
| 765,823 | 7/1904 | Erb, Jr. | 119/856 X |
| 1,456,706 | 5/1923 | Murray | 119/855 |
| 2,595,302 | 5/1952 | Sanders | 119/815 |
| 4,010,604 | 3/1977 | Tesch | 59/85 X |
| 4,286,547 | 9/1981 | Newbauer et al. | 119/815 |
| 4,719,876 | 1/1988 | Wilken | 119/815 |
| 5,307,764 | 5/1994 | Moy | 119/815 |
| 5,363,677 | 11/1994 | Cox | 70/18 |

*Primary Examiner*—Michael J. Carone
*Assistant Examiner*—Yvonne R. Abbott
*Attorney, Agent, or Firm*—Thomas I. Rozsa; Tony D. Chen

[57] ABSTRACT

An interlockable pet collar for preventing an animal from biting or licking the affected injured areas of its body. The interlockable pet collar comprises a multiplicity of open frame structures which can be interconnected to each other to provide an unlimited length of the pet collar. Each open frame structure has three side legs which are integrally formed with a top and bottom legs. One of the three sides legs has two apertures remote from each other. Another one of the three sides legs has two fasteners which are located remote from each and has a distance which is approximately equal to the distance between the two apertures. Each one of the open frames structures is attached to each other by inserting a respective one of the two fasteners to a respective one of the two apertures of another open frame structure, and etc, thereby forming a tubular or cylindrical shaped collar to accommodate an animal's neck. In another alternative embodiment, the embodiment comprises either half structures or one-third 120° structures to form a tubular shape collar which can be adjustably interconnected to accommodate the neck thickness of the animal.

67 Claims, 3 Drawing Sheets

INTERLOCKABLE PET COLLAR

BACKGROUND OF THE INVENTION

1. Field of the Invention

The present invention generally relates to the field of devices for preventing a wounded or convalescing dog, cat, or other animal from injuring itself. More particularly, the present invention relates to a pet collar or neck brace which prevents the animal from biting or licking the affected wounded areas of its body.

2. Description of the Prior Art

Generally, domesticated animals such as household pets are likely to lick or bite at surgical areas after receiving treatment for wounds, sores, rashes, flea bites and other afflicted areas of their bodies. Therefore, unless the animal is prevented from licking or biting the affected wounded area, the healing process will be prolonged and may lead to complications which require further medical attention.

The following five (5) prior art patents were uncovered in the pertinent field of the present invention:

1. U.S. Pat. No. 439,598 issued to Huntoon et al. on Oct. 28, 1890 for "Horse Neck Poke" (hereafter "the Huntoon Patent");
2. U.S. Pat. No. 1,456,706 issued to Murray on May 29, 1923 for "Sheep Protector" (hereafter "the Murray Patent");
3. U.S. Pat. No. 4,719,876 issued to Wilken on Jan. 19, 1988 for "Restraint Collar" (hereafter "the Wilken Patent");
4. U.S. Pat. No. 4,286,547 issued to Newbauer et al. on Sept. 1, 1981 for "Animal Restraint Unit" (hereafter "the Newbauer Patent"); and
5. U.S. Pat. No. 5,307,764 issued to Moy on May 3, 1994 for "Protective Pet Collar" (hereafter "the Moy Patent").

The Huntoon Patent discloses a horse neck poke which comprises an upper horizontal strap, a lower horizontal strap and a plurality of parallel vertical rods. The plurality of parallel vertical rods are attached to the upper and lower straps to form a neck brace or collar. Each individual vertical rod is permanently affixed and the rods are spaced apart so as not to touch each other.

The Murray Patent discloses a sheep protector. It comprises a pair of side members, where each member has upper and lower transverse plates and curved plates connected to the upper and lower transverse plates. Each of the curved plates is longitudinally and centrally channeled, and a spring is disposed in each channel and secured at the end to one plate. The springs are utilized for permitting easy sliding movement of the curved plates while the sheep moves its head.

The Wilken Patent discloses a restraint collar for restricting the movement of an animal's head. It comprises a pliable and thickened elongated pad which is placed around the animal's neck between the shoulder and the base of the head. The opposite ends of the pad provide a releasable closure for securing the collar about the animal's neck. The closure comprises a hook and pile fastener joining the ends longitudinally and transversely to prevent inadvertent detachment of overlapped ends.

The Newbauer Patent discloses an animal restraint unit. It comprises a collar, a waistband and a pair of rectilinear lateral pieces pivotally and releasably connected to the collar and the waistband.

The Moy Patent discloses a protective pet collar. It comprises a sheet of hard, flexible material which is formed around an animal's neck to prevent the animal from bending its neck so as to bite or lick an affected wounded area on its body.

None of these prior art patents have disclosed an interlockable pet collar which is designed and constructed for precisely varying the length of the pet collar so that the pet collar will fit any diameter of an animal's neck. It is highly desirable to have a very efficient and also very effective design and construction of an interlockable pet collar which can be adapted to any animal's neck size.

SUMMARY OF THE INVENTION

The present invention is a novel and unique interlockable pet collar for preventing an animal from biting or licking the affected injured areas of its body. The present invention interlockable pet collar comprises a multiplicity of open frame structures which can be interconnected to each other to provide an unlimited length of the pet collar. Each open frame structure has three side legs, a top leg and a bottom leg. The three side legs are integrally formed with the top and bottom legs to form the open frame structure. One of the three sides legs has two apertures remote from each other. Another one of the three side legs has two clip fasteners which are located remote from each other at a distance which is approximately equal to the distance between the two apertures. Each one of the open frame structures is attached to the other by inserting the two clip fasteners to the two apertures of another one of the open frame structures, etc, thereby forming a tubular or cylindrical shaped collar.

The object of the present invention is to provide an interlockable pet collar that can easily be adjusted to accommodate different diameters of the animal's neck. The interlockable pet collar is placed around the animal's neck to form a cylindrical or tubular shaped collar. The collar substantially prevents the animal from bending its neck further, and thereby prevents the animal from biting or licking a wound on its body.

It is therefore an object of the present invention to provide an interlockable pet collar with a multiplicity of interconnected open frame structures to accommodate different diameters of an animal's neck, thereby eliminating the need for excess long pet collars.

It is also an object of the present invention to provide an interlockable pet collar with a multiplicity of interlockable open frame structures which can easily be adjusted to accommodate different sized animal necks.

It is an additional object of the present invention to provide an interlockable pet collar with a multiplicity of interlockable open frame structures which are generally rectangular shaped to form a tubular shaped collar to accommodate the animal's neck.

It is a further object of the present invention to provide an interlockable pet collar with a multiplicity of interlockable open frame structures which are generally trapezoidal shaped to form a frusto-conical shaped collar to accommodate the animal's neck.

It is another object of the present invention to provide an interlockable pet collar with a multiplicity of interlockable open frame structures which are generally isosceles triangle shaped to form a tubular or cylindrical shaped collar to accommodate the animal's neck.

It is still another object of the present invention to provide a pet collar having two semi-circle halve members to from a tubular or cylindrical shaped collar to accommodate the animal's neck.

It is still a further object of the present invention to provide a pet collar having a trio of 120° members to from a tubular or cylindrical shaped collar to accommodate the animal's neck.

In the preferred embodiment of the present invention, the interlockable pet collar comprises a multiplicity of open frame structures interconnected to each other to form a tubular or cylindrical shaped collar, where each one of the multiplicity of open frame structures is generally rectangular shaped.

In an alternative embodiment of the present invention, the interlockable pet collar comprises a multiplicity of open frame structures interconnected to each other to form a frusto-conical shaped collar, where each one of the multiplicity of open frame structures is generally trapezoidal shaped.

In another alternative embodiment of the present invention, the interlockable pet collar comprises a multiplicity of open frame structures interconnected to each other by alternating each open frame structure to form a tubular or cylindrical shaped collar, where each one of the multiplicity of open frame structures is generally trapezoidal shaped.

In still another alternative embodiment of the present invention, a pet collar comprises two semi-circle halve members connected together to form a cylindrical shaped collar.

In a further alternative embodiment of the present invention, a pet collar comprises a trio of 120° members connected together to form a cylindrical shaped pet collar.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
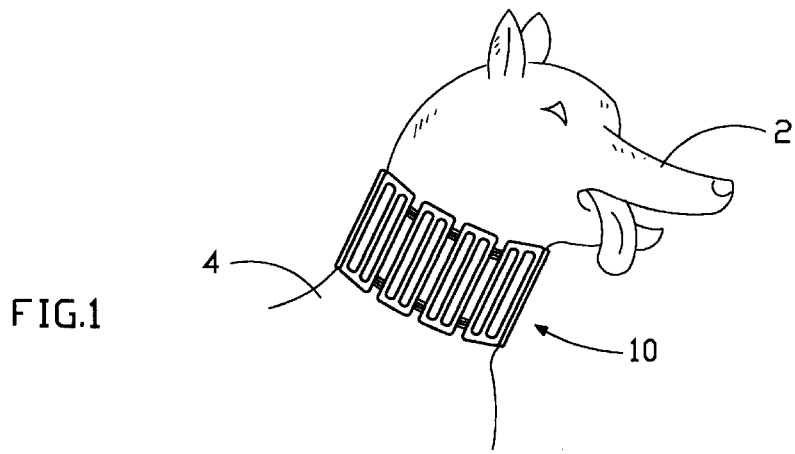
FIG. 1 is an illustration of the present invention interlockable pet collar as worn by a dog.
Figure 2:
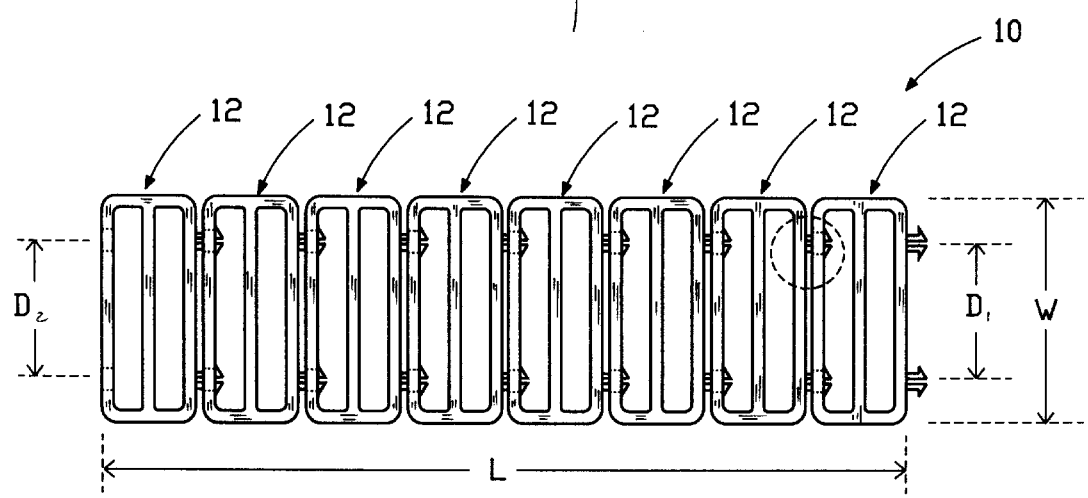
FIG. 2 is a side elevational view of the preferred embodiment of the present invention interlockable pet collar, showing a multiplicity of interlockable open frame structures interconnected to each other.

Referring to FIGS. 1 and 2, FIG. 1 is an illustration of the present invention interlockable pet collar 10 utilized on a neck 4 of a dog 2, and FIG. 2 is a side elevational view of the preferred embodiment of the present invention interlockable pet collar 10. The interlockable pet collar 10 comprises a multiplicity of interlockable open frame structures 12 which are interconnected to each other. Each of the interlockable open frame structures 12 are substantially identical, and to the extent they are, only one will be described in detail.

Figure 3:
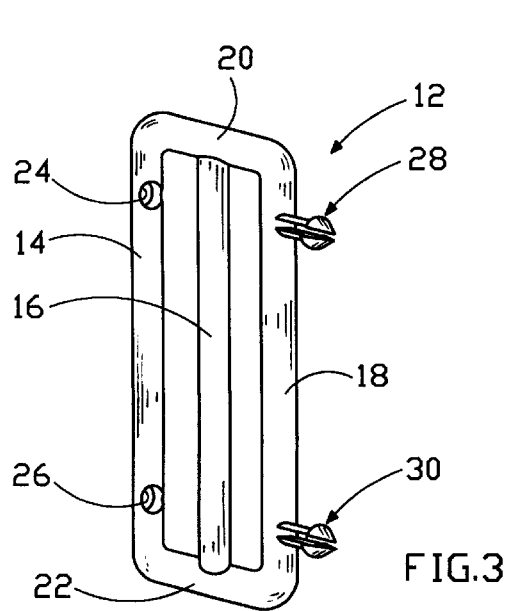
FIG. 3 is an enlarged perspective view of one of the multiplicity of interlockable open frame structures of the present invention interlockable pet collar, showing the two male clip fasteners.
Figure 4:
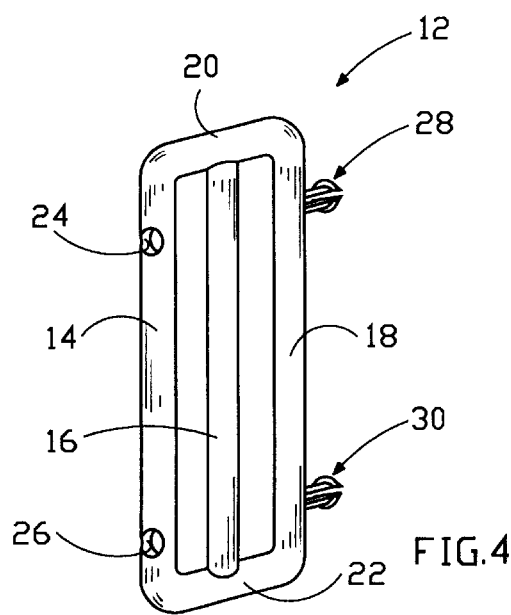
FIG. 4 is an enlarged perspective view of one of the multiplicity of interlockable open frame structures of the present invention interlockable pet collar, showing the two apertures.

Referring to FIGS. 3 and 4, there are shown respective perspective views of one of the multiplicity of interlockable open frame structures 12. The open frame structure 12 has three spaced apart vertical straight cylindrical shaped side legs 14, 16 and 18 which are integrally formed with two opposite horizontal cylindrical shaped legs 20 and 22.

The side leg 14 has two apertures 24 and 26 therethrough and spaced apart from one another. The side leg 18 has two male clip fasteners 28 and 30 which are integrally formed and spaced apart from one another. The distance $D_1$ between the clip fasteners 28 and 30 is approximately the same distance as $D_2$ which is between the two apertures 24 and 26. Each clip fastener has a slot 36 therebetween (see FIG. 5), which divides a first half clip 32 and a second opposite half clip 34.

Figure 5:
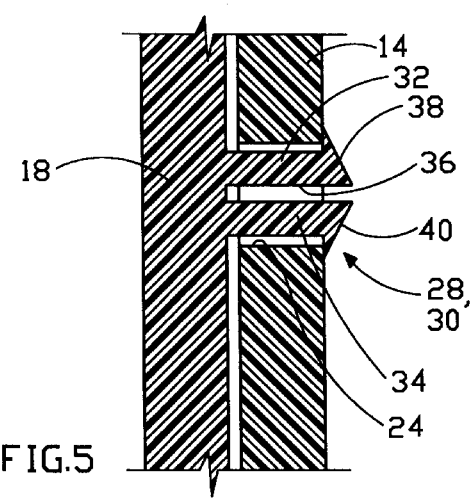
FIG. 5 is an enlarged cross-sectional view from the dotted circle shown in FIG. 2, showing the interconnection between the male clip fastener and the aperture.

Referring to FIG. 5, there is shown an enlarged cross-sectional view of how the open frame structures 12 are interconnected. Each of the clip fasteners 28 and 30 are substantially identical, and to the extent they are, only one will be described in detail. To lock the open frame structures 12 together, the clip fasteners 28 and 30 are respectively inserted through the apertures 24 and 26, where the two half clips 32 and 34 are squeezed toward each such that the clip fasteners 28 and 30 are respectively fitted within the apertures 24 and 26, and expand when head portions 38 and 40 of the two half clips 32 and 34 are pushed out from the apertures 24 and 26, thereby respectively locking the clip fasteners 28 and 30 to the apertures 24 and 26 as shown. Each one of the multiplicity of open frame structures 12 are interconnected to each other the same way as just discussed above. Once the length L of the interlockable pet collar 10 is determined for the animal's neck, the last open frame structure 12 which is shown at the right side of FIG. 2 is interconnected to the first open frame structure 12 which is shown at the left side of FIG. 2, thereby forming a tubular shaped collar which is attached around the animal's neck. The length L of the interlockable pet collar 10 should be such that the collar fits snugly on the animal's neck but does not create discomfort unless the animal attempts to turn its head.

What is unique about the present invention interlockable pet collar 10 is that it has gaps between the side legs 14, 16 and 18 on the frame structure 12 so that the areas of the gaps are not covering the animal, thereby allowing the animal to breathe.

Referring again to FIGS. 1 and 3, as the dog 2 attempts to bend its neck 4, the two opposite horizontal legs 20 and 22 of the interlockable pet collar 10 press on its skin, creating a certain amount of discomfort or minor pain and deterring the dog 2 from bending its neck 4 further. If the dog 2 continues to bend its neck 4 further, eventually the pet collar 10 will prevent the dog 2 from any further bending movement.

With the present invention interlockable pet collar 10, the animal is free to drink, eat and sleep without extreme hindrance or discomfort. In addition, the animal can walk, run and otherwise engage in most of its regular activities, the only restriction being on its ability to turn its head so as to bring its mouth or tongue in contact with its body.

Preferably, the interlockable collar 10 should extend substantially between the animal's scapula (shoulder blade) at the lower edge and its mandible (low jaw) and atlas vertebra at the upper edge, and thereby the animal's entire neck is restricted.

It will be appreciated that the present invention interlockable pet collar is not limited for utilization with a dog as illustrated in FIG. 1. It is within the spirit and scope of the present invention to be suitable for use with cats and other household pets, as well as any animal whose head needs to be restrained in order to prevent it from injuring itself.

The present invention conforms to conventional forms of manufacture or any other conventional way known to one skilled in the art. By way of example, the open frame structure 12 may be made from a flexible material which may a low density polyethylene or other suitable material. The manufacturing process which could accommodate the construction of the open frame structure 12 may be injection, thermoform, etc. or other molding process.

Figure 6:
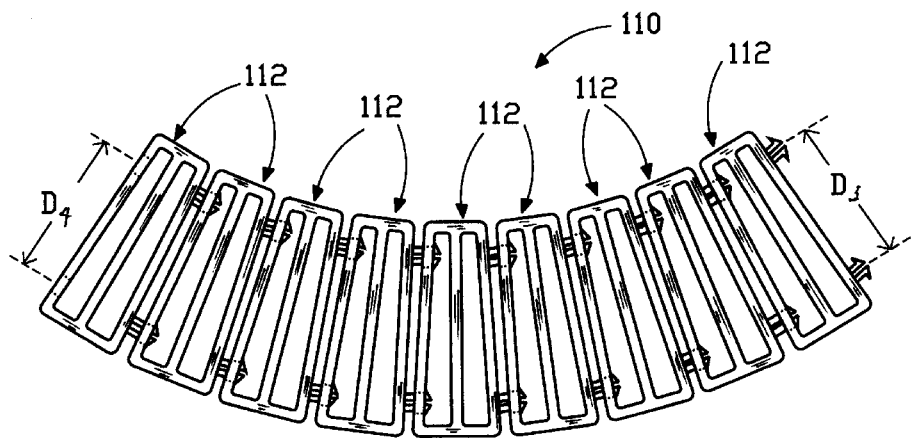
FIG. 6 is a side elevational view of an alternative embodiment of the present invention interlockable pet collar, showing a multiplicity of interlockable open frame structures interconnected to each other to form an interlockable semi-curved pet collar, where each open frame structure is trapezoidal shaped.

Referring to FIG. 6, there is shown at 110 a side elevational view of an alternative embodiment of the present invention interlockable pet collar 110. The interlockable pet collar 110 comprises a multiplicity of interlockable open frame structures 112 which are interconnected to each other. Each of the interlockable open frame structures 112 are substantially identical, and to the extent they are, only one will be described in detail.

Figure 7:
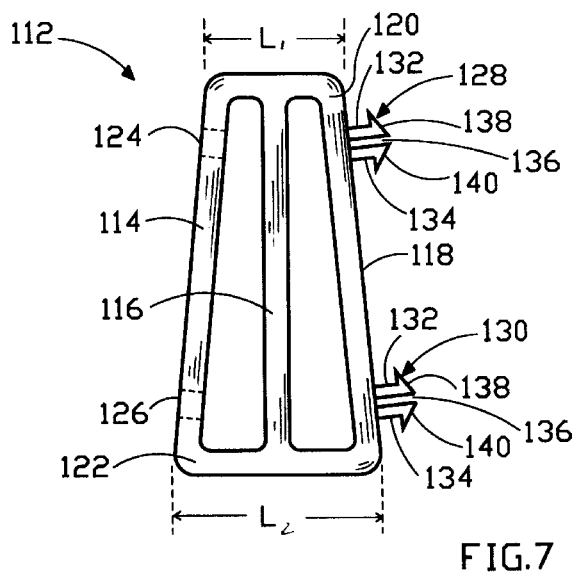
FIG. 7 is an enlarged side elevational view of one of the multiplicity of interlockable open frame structures shown in FIG. 6.

Referring to FIG. 7, there is shown at 112 a side elevational view of one of the multiplicity of open frame structures 112. The open frame structure 112 has three spaced apart cylindrical shaped side legs 114, 116 and 118 which are integrally formed with two opposite horizontal cylindrical shaped legs 120 and 122. The side legs 114 and 118 are generally at an inclined angle such that the length $L_1$ of the horizontal leg 120 is shorter than the length of $L_2$ of the horizontal leg 122. The open frame structure 112 is generally a triangle shaped.

Referring to FIGS. 6 and 7, the side leg 114 has two apertures 124 and 126 (shown in dashed lines) therethrough and spaced apart from one another. The side leg 118 has two male clip fasteners 128 and 130 which are integrally formed and spaced apart from one another. The distance $D_3$ between the clip fasteners 128 and 130 is approximately the same distance as distance $D_4$ which is between the two apertures 124 and 126. Each clip fastener has a slot 136 therebetween, which divides the clip fastener into a first half clip 132 and a second opposite half clip 134.

Each clip fastener 128 and 130 are substantially identical, and to the extent they are, only one will be described in detail. To lock the open frame structures 112 together, the clip fasteners 128 and 130 are respectively inserted through the apertures 124 and 126, where the two half clips 132 and 134 are squeezed toward each such that the clip fasteners 128 and 130 are respectively fitted within the apertures 124 and 126, and expand when head portions 138 and 140 of the two half clips 132 and 134 are pushed out from the apertures 124 and 126, thereby locking the clip fasteners 128 and 130 to the apertures 124 and 126 as shown. Each one of the multiplicity of open frame structures 112 are interconnected to each other the same way as just discussed above. Once the length of the interlockable pet collar 110 is determined for the animal's neck, the last open frame structure 112 which is shown at the right side of FIG. 6 is interconnected to the first open frame structure 112 which is shown at the left side of FIG. 6, thereby forming a frusto-conical shaped collar which is attached around the animal's neck. The length of the interlockable pet collar 110 should be such that the collar fits snugly on the animal's neck but does not create discomfort unless the animal attempts to turn its head.

What is unique about the present invention interlockable pet collar 110 is that it has gaps between the side legs 114, 116 and 118 on the frame structure 112 so that the areas of the gaps are not covering the animal, thereby allowing the animal to breathe.

With the present invention interlockable pet collar 110, the animal is free to drink, eat and sleep without extreme hindrance or discomfort. In addition, the animal can walk, run and otherwise engage in most of its regular activities, the only restriction being on its ability to turn its head so as to bring its mouth or tongue in contact with its body.

The alternative embodiment of the present invention interlockable pet collar 110 is suitable for dogs, cats or other household pets, as well as any animal whose head needs to be restrained in order to prevent it from injuring itself.

Figure 8:
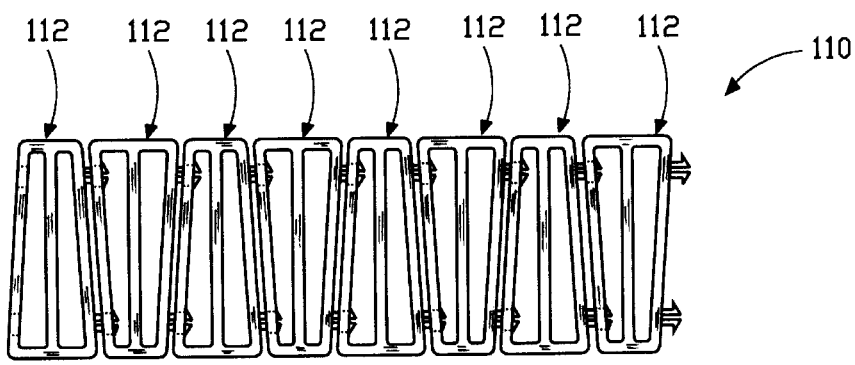
FIG. 8 is a side elevational view of the present invention interlockable pet collar shown in FIG. 6, showing a multiplicity of interlockable open frame structures interconnected to each other to form a straight pet collar.

Referring to FIG. 8, there is shown another way of connecting the open frame structures 112 of the interlockable pet collar 110 shown in FIGS. 6 and 7, where each one of the multiplicity of open frame structures 112 are connected opposite to one another. In other words, the first one of the multiplicity of open frame structures 112 which is shown on the left side of FIG. 8 forms an upright triangle and the next one of the multiplicity of open frame structures 112 forms an upside down triangle, etc, thereby forming a tubular shaped collar instead of the frusto-conical shaped collar as described in FIGS. 6 and 7. Since the open frame structure 112 is identical as previously described in FIGS. 6 and 7, the description thereof will not be repeated.

Figure 9:
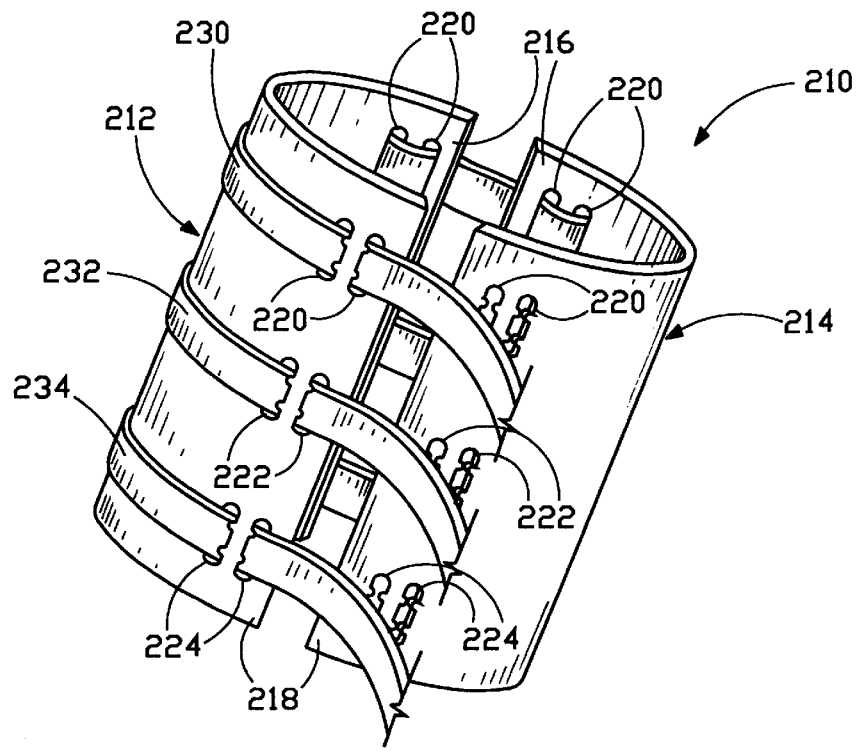
FIG. 9 is a perspective view of another alternative embodiment of the present invention pet collar, showing two semi-circle halve members forming a cylindrical shaped pet collar.

Referring to FIG. 9, there is show at 210 a perspective view of another alternative embodiment of the present invention pet collar which may be worn on the necks of a dog, a cat or other household pets, as well as any animal. The pet collar 210 comprises a first semi-circular cylindrical shaped half member 212 and a second semi-circular shaped half member 214. Each half member is substantially the same shaped and size. Each half member forms a 180° portion of a 360° circle. Each half member has two opposite side edges 216 and 218 with three side-by-side slotted apertures 220, 222 and 224. The three side-by-side slotted apertures 220, 222 and 224 on the side edge 218 of the second semi-circular shaped half member 214 have teeth therein.

The pet collar 210 has means for adjustably securing the first and second half members together to form a 360° cylindrical or tubular shaped collar around the animal's neck, where the diameter of the collar 210 is adjustable to accommodate different sizes of the animal's neck. The means comprises a multiplicity of elongated straps 230, 232 and 234 which are respectively inserted through the multiplicity of slotted apertures 220, 222 and 224, and secured in place at the three side-by-side slotted apertures 220, 222 and 224 on the side edge 218 of the second semi-circular shaped half member 214, where the teeth retain the straps 230, 232 and 234 and prevent them from movement.

Figure 10:
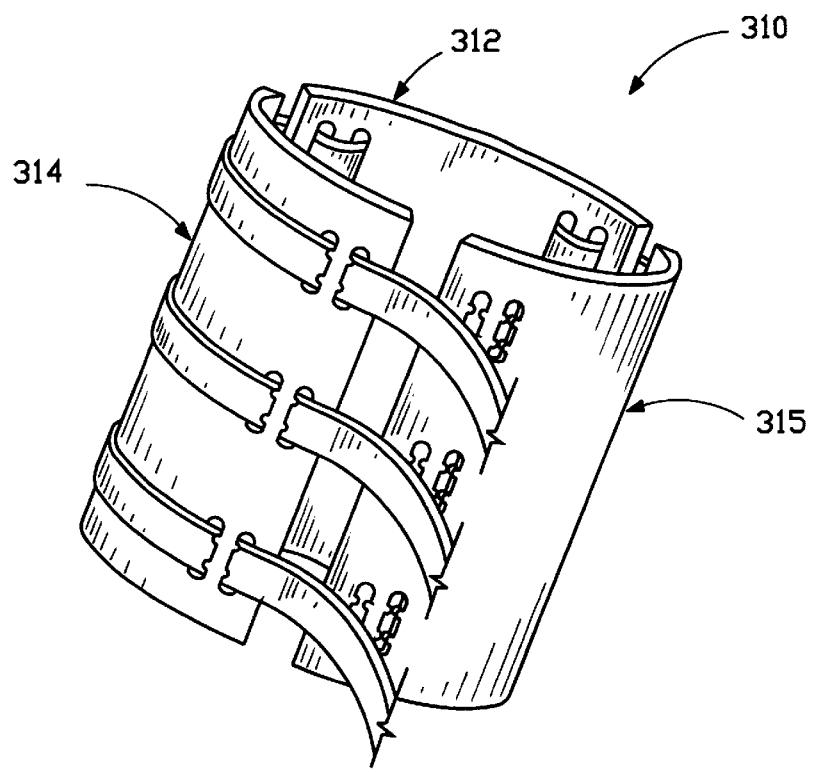
FIG. 10 is a perspective view of still another alternative embodiment of the present invention pet collar, showing a trio of 1200 members forming a cylindrical shaped pet collar.

Referring to FIG. 10, there is show at 310 a perspective view of still another alternative embodiment of the present invention pet collar which may be worn on the neck of a dog, a cat or other household pets, as well as any animal. In this embodiment, the first and second semi-circular cylindrical shaped half members 212 and 214 shown in FIG. 9 are substituted by three elongated members 312, 314 and 315. Since the pet collar 310 functions and assembles similar to the previously described pet collar shown in FIG. 9, the description thereof will not be repeated. Instead of having two cover members 212 and 214 as shown in FIG. 9, this embodiment has three cover member 314, 314 and 315 which are substantially the same shaped and size. The three cover members 312, 314 and 315 are each 120° to thereby form a 360° circle.

Defined in detail, the present invention is an interlockable collar for an animal, comprising: (a) a multiplicity of interlockable open frame structures, each open frame structure having a first straight side leg, a middle straight side leg, a second straight side leg, a top leg and a bottom leg, the first, middle and second side legs integrally formed with the top and bottom legs to form a generally rectangular shaped structure; (b) the first side leg having two apertures therethrough and located spaced apart from one another; (c) the second side leg having two clip fasteners located spaced apart from one another by a distance approximately equal to the distance between the two apertures of the first side leg; and (d) the each one of the multiplicity of open frame structures interconnected to each other by inserting a respective one of the two clip fasteners of the second side leg of one frame structure into a respective one of the two apertures of the first side leg of an adjacent frame structure respectively to form a tubular shaped collar around the animal's neck; (e) whereby when the tubular shaped collar is formed around the animal's neck, the collar thereby substantially prevents the animal from bending its neck to bite or lick an affected area on its body.

Defined broadly, the present invention is an interlockable collar for an animal, comprising: (a) a multiplicity of interlockable open frame structures, each open frame structure having a first straight side leg, a second straight side leg, a top leg and a bottom leg, the first and second side legs integrally formed with the top and bottom legs to form a generally rectangular shaped structure; (b) the first side leg having two apertures therethrough and located spaced apart from one another; (c) the second side leg having two clip fasteners located spaced apart from one another by a distance approximately equal to the distance between the two apertures of the first side leg; and (d) the each one of the multiplicity of open frame structures interconnected to each other by inserting a respective one of the two clip fasteners of the second side leg of one frame structure into a respective one of the two apertures of the first side leg of an adjacent frame structure respectively to form a tubular shaped collar around the animal's neck; (e) whereby when the tubular shaped collar is formed around the animal's neck, the collar thereby substantially prevents the animal from bending its neck to bite or lick an affected area on its body.

Defined alternatively in detail, the present invention is an interlockable collar for an animal, comprising: (a) a multiplicity of interlockable open frame structures, each open frame structure having a first angular side leg, a middle side leg, a second angular side leg, a top leg and a bottom leg which is longer than the top leg, the first, middle and second side legs integrally formed with the top and bottom legs to form a generally trapezoidal shaped structure; (b) the first side leg having two apertures therethrough and located spaced apart from one another; (c) the second side leg having two clip fasteners located spaced apart from one another by a distance approximately equal to the distance between the two apertures of the first side leg; and (d) the each one of the multiplicity of open frame structures interconnected to each other by inserting a respective one of the two clip fasteners of the second side leg of one frame structure into a respective one of the two apertures of the first side leg of an adjacent one frame structure respectively to form a collar around the animal's neck; (e) whereby when the collar is formed around the animal's neck, the collar thereby substantially prevents the animal from bending its neck to bite or lick an affected area on its body.

Defined alternatively broadly, the present invention is an interlockable collar for an animal, comprising: (a) a multiplicity of interlockable open frame structures, each open frame structure having a first angular side leg, a second angular side leg, a top leg and a bottom leg which is longer than the top leg, the first and second side legs integrally formed with the top and bottom legs to form a generally trapezoidal shaped structure; (b) the first side leg having two apertures therethrough and located spaced apart from one another; (c) the second side leg having two clip fasteners located spaced apart from one another by a distance approximately equal to the distance between the two apertures of the first side leg; and (d) the each one of the multiplicity of open frame structures interconnected to each other by inserting a respective one of the two clip fasteners of the second side leg of one frame structure into a respective one of the two apertures of the first side leg of an adjacent frame structure respectively to form a collar around the animal's neck; (e) whereby when the collar is formed around the animal's neck, the collar thereby substantially prevents the animal from bending its neck to bite or lick an affected area on its body.

Defined more broadly, the present invention is a collar for an animal, comprising: (a) a multiplicity of interlockable open frame structures, each open frame structure having at least two side legs, a top leg and a bottom leg, the at least two side legs integrally attached to the top and bottom legs; (b) a respective one of the at least two side legs having at least two apertures therethrough; (c) another one of the respective at least two side legs having at least two clips; and (d) the each one of the multiplicity of open frame structures interconnected to each other by inserting a respective one of the at least two clips of the respective one of the at least two side legs of one frame structure into a respective one of the at least two apertures of the another one of the at least two side legs of an adjacent frame structure respectively to form a collar around the animal's neck; (e) whereby when the collar is formed around the animal's neck, the collar thereby substantially prevents the animal from bending its neck to bite or lick an affected area on its body.

Defined also alternatively in detail, the present invention is a pet collar for an animal, comprising: (a) a first half member and a second half member, each half member forming a 180° portion of a tubular shaped collar and being substantially the same shape and size; and (b) means for adjustably securing the first and second half members to form the tubular shaped collar around the animal's neck, where the diameter of the collar is adjustable to accommodate different sizes of the animal's neck; (c) whereby when the tubular shaped collar is formed around the animal's neck, the collar thereby substantially prevents the animal from bending its neck to bite or lick an affected area on its body.

Defined further alternatively in detail, the present invention is a pet collar for an animal, comprising: (a) three elongated members, each forming a 120° portion of a tubular shaped collar and being substantially the same shape and size; and (b) means for adjustably securing the three elongated members to form the tubular shaped collar around the animal's neck, where the diameter of the collar is adjustable to accommodate different sizes of the animal's neck; (c) whereby when the tubular shaped collar is formed around the animal's neck, the collar thereby substantially prevents the animal from bending its neck to bite or lick an affected area on its body.

Defined also alternatively more broadly, the present invention is a collar for an animal, comprising: (a) at least two cover members being substantially the same shape and size; and (b) means for adjustably securing the at least two cover members to form a tubular collar around the animal's neck, where the diameter of the collar is adjustable to accommodate different sizes of the animal's neck; (c) whereby when the collar is formed around the animal's neck, the collar thereby substantially prevents the animal from bending its neck to bite or lick an affected area on its body.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An interlockable collar for an animal, comprising:
   a. a multiplicity of interlockable open frame structures, each open frame structure having a first straight side leg, a middle straight side leg, a second straight side leg, a top leg and a bottom leg, the first, middle and second side legs integrally formed with the top and bottom legs to form a generally rectangular shaped structure;
   b. said first side leg having two apertures therethrough and located spaced apart from one another;
   c. said second side leg having two clip fasteners located spaced apart from one another by a distance approximately equal to the distance between said two apertures of said first side leg; and
   d. said each one of said multiplicity of open frame structures interconnected to each other by inserting a respective one of said two clip fasteners of said second side leg of one frame structure into a respective one of said two apertures of said first side leg of an adjacent frame structure respectively to form a tubular shaped collar around the animal's neck, wherein each of said two clip fasteners of said second side leg of a frame structure has a slot therebetween to divide the clip fastener into a first half and a second half so that each of said two clip fasteners are deformable to be inserted into said respective one of said two apertures of said first side leg of said adjacent frame structure;
   e. whereby when said tubular shaped collar is formed around the animal's neck, said collar thereby substantially prevents the animal from bending its neck to bite or lick an affected area on its body.

2. The interlockable collar in accordance with claim 1 wherein said each one of said multiplicity of interlockable open frame structures has an open area for allowing air to flow therethrough, wherein said tubular shaped collar is formed around the animal's neck.

3. The interlockable collar in accordance with claim 1 wherein said each one of said multiplicity of interlockable open frame structures is made of plastic material.

4. The interlockable collar in accordance with claim 1 wherein said tubular shaped collar is intended for a dog.

5. The interlockable collar in accordance with claim 1 wherein said tubular shaped collar is intended for a cat.

6. An interlockable collar for an animal, comprising:
   a. a multiplicity of interlockable open frame structures, each open frame structure having a first angular side leg, a middle side leg, a second angular side leg, a top leg and a bottom leg which is longer than the top leg, the first, middle and second side legs integrally formed with the top and bottom legs to form a generally trapezoidal shaped structure;
   b. said first side leg having two apertures therethrough and located spaced apart from one another;
   c. said second side leg having two clip fasteners located spaced apart from one another by a distance approximately equal to the distance between said two apertures of said first side leg; and
   d. said each one of said multiplicity of open frame structures interconnected to each other by inserting a respective one of said two clip fasteners of said second side leg of one frame structure into a respective one of said two apertures of said first side leg of an adjacent one frame structure respectively to form a collar around the animal's neck;
   e. whereby when said collar is formed around the animal's neck, said collar thereby substantially prevents the animal from bending its neck to bite or lick an affected area on its body.

7. The interlockable collar in accordance with claim 6 wherein said each one of said multiplicity of interlockable open frame structures has an open area for allowing air to flow therethrough, wherein said collar is formed around the animal's neck.

8. The interlockable collar in accordance with claim 6 wherein each said two clip fasteners of said second side leg of frame structure has a slot therebetween to divide the clip fastener into a first half and a second half so that each of said two clip fasteners are deformable to be inserted into a respective one of said two apertures of said first side leg of said adjacent frame structure.

9. The interlockable collar in accordance with claim 6 wherein said each one of said multiplicity of interlockable open frame structures is made of plastic material.

10. The interlockable collar in accordance with claim 6 wherein said collar is intended for a dog.

11. The interlockable collar in accordance with claim 6 wherein said collar is intended for a cat.

12. The interlockable collar in accordance with claim 6 wherein each open frame structure is aligned in the same direction with its adjacent open frame structure to thereby form a collar which is generally a frusto-conical shape.

13. The interlockable collar in accordance with claim 6 wherein the open frame structures are aligned with a respective open frame structure aligned opposite to its adjacent open frame structure to thereby form a collar which is generally a tubular shape.

14. An interlockable collar for an animal, comprising:
   a. a multiplicity of interlockable open frame structures, each open frame structure having a first angular side leg, a second angular side leg, a top leg and a bottom leg which is longer than the top leg, the first and second side legs integrally formed with the top and bottom legs to form a generally trapezoidal shaped structure;
   b. said first side leg having two apertures therethrough and located spaced apart from one another;
   c. said second side leg having two clip fasteners located spaced apart from one another by a distance approximately equal to the distance between said two apertures of said first side leg; and
   d. said each one of said multiplicity of open frame structures interconnected to each other by inserting a respective one of said two clip fasteners of said second side leg of one frame structure into a respective one of said two apertures of said first side leg of an adjacent frame structure respectively to form a collar around the animal's neck;
   e. whereby when said collar is formed around the animal's neck, said collar thereby substantially prevents the animal from bending its neck to bite or lick an affected area on its body.

15. The interlockable collar in accordance with claim 14 wherein each open frame structure is aligned in the same direction with its adjacent open frame structure to thereby form a collar which is generally a frusto-conical shape.

16. The interlockable collar in accordance with claim 14 wherein the open frame structures are aligned with a respective open frame structure aligned opposite to its adjacent open frame structure to thereby form a collar which is generally a tubular shape.

17. A collar for an animal, comprising:
   a. a multiplicity of interlockable open frame structures, each open frame structure having at least two side legs, a top leg and a bottom leg, the at least two side legs integrally attached to the top and bottom legs;
   b. a respective one of said at least two side legs having at least two apertures therethrough;
   c. another one of said respective at least two side legs having at least two clips; and
   d. said each one of said multiplicity of open frame structures interconnected to each other by inserting a respective one of said at least two clips of said respective one of said at least two side legs of one frame structure into a respective one of said at least two apertures of said respective one of said at least two side legs of an adjacent frame structure to form a collar around the animal's neck, wherein each of said at least two clips has a slot therebetween to divide each clip into a first half and a second half so that said at least two clips are deformable to be inserted into said respective one of said at least two apertures of said respective one of said at least two side legs of said adjacent frame structure;
   e. whereby when said collar is formed around the animal's neck, said collar thereby substantially prevents the animal from bending its neck to bite or lick an affected area on its body.

18. The collar in accordance with claim 17 wherein said each one of said multiplicity of interlockable open frame structures has an open area for allowing air to flow therethrough, wherein said collar is formed around the animal's neck.

19. The collar in accordance with claim 17 wherein said each one of said multiplicity of interlockable open frame structures is generally a rectangular shape.

20. The collar in accordance with claim 17 wherein said each one of said multiplicity of interlockable open frame structures is generally a trapezoidal shape.

21. The collar in accordance with claim 17 wherein said each one of said multiplicity of interlockable open frame structures is made of plastic material.

22. The collar in accordance with claim 17 wherein said collar is intended for a dog.

23. The collar in accordance with claim 17 wherein said collar is intended for a cat.

24. The collar in accordance with claim 17 wherein each open frame structure is aligned in the same direction with its adjacent open frame structure to thereby form a collar which is generally a frusto-conical shape.

25. The collar in accordance with claim 17 wherein the open frame structures are aligned with a respective open frame structure and aligned opposite to its adjacent open frame structure to thereby form a collar which is generally a tubular shape.

26. A pet collar for an animal, comprising:
   a. a first half member and a second half member, each half member forming a 180° portion of a tubular shaped collar and being substantially the same shape and size, each half member having two opposite side edges, each side edge having a multiplicity of apertures wherein certain of the apertures of one of the half members having teeth therethrough; and
   b. means for adjustably securing said first and second half members to form said tubular shaped collar around the animal's neck, where the diameter of said collar is adjustable to accommodate different sizes of the animal's neck;
   c. whereby when said tubular shaped collar is formed around the animal's neck, said collar thereby substantially prevents the animal from bending its neck to bite or lick an affected area on its body.

27. The pet collar in accordance with claim 26 wherein said means for adjustably securing said first and second half members comprises a multiplicity of straps, where each one of the multiplicity of straps is respectively inserted through an aligned group of said multiplicity of apertures at said side edges of said first and second half members and secured in place by said teeth.

28. The pet collar in accordance with claim 26 wherein said first and second half members are made of plastic material.

29. The pet collar in accordance with claim 26 wherein said tubular shaped collar is generally intended for a dog.

30. The pet collar in accordance with claim 26 wherein said tubular shaped collar is generally intended for a cat.

31. A pet collar for an animal, comprising:
   a. three elongated members, each forming a 120° portion of a tubular shaped collar and being substantially the same shape and size; and
   b. means for adjustably securing said three elongated members to form said tubular shaped collar around the animal's neck, where the diameter of said collar is adjustable to accommodate different sizes of the animal's neck;

c. whereby when said tubular shaped collar is formed around the animal's neck, said collar thereby substantially prevents the animal from bending its neck to bite or lick an affected area on its body.

32. The pet collar in accordance with claim 31 further comprising two opposite side edges on each one of s three elongated members, each side edge having a multiplicity of apertures when certain of the apertures on at least one 120° member have teeth therethrough.

33. The pet collar in accordance with claim 32 wherein said means for adjustably securing said three members comprises a multiplicity of straps, where each one of the multiplicity of straps is respectively inserted through an aligned group of said multiplicity of apertures at said side edges of said three members.

34. The pet collar in accordance with claim 31 wherein said three elongated members are made of plastic material.

35. The pet collar in accordance with claim 31 wherein said tubular shaped collar is generally intended for a dog.

36. The pet collar in accordance with claim 31 wherein said tubular shaped collar is generally intended for a cat.

37. A collar for an animal, comprising:

a. at least two cover members being substantially the same shape and size, each member having two opposite side edges, each side edge having a multiplicity of apertures wherein certain of the apertures of one of the at least two cover members have teeth therethrough; and b. means for adjustably securing said at least two cover members to form a tubular collar around the animal's neck, where the diameter of the collar is adjustable to accommodate different sizes of the animal's neck;

c. whereby when said collar is formed around the animal's neck, said collar thereby substantially prevents the animal from bending its neck to bite or lick an affected area on its body.

38. The collar in accordance with claim 37 wherein said means for adjustably securing said at least two cover members comprises a multiplicity of straps, where each one of the multiplicity of straps is respectively inserted through an aligned group of said multiplicity of apertures at said side edges of said at least two cover members.

39. A collar for an animal, comprising:

a. a multiplicity of interlockable open frame structures, each open frame structure having at least two side legs, a top leg and a bottom leg, the at least two side legs integrally attached to the top and bottom legs, wherein each one of the multiplicity of interlockable open frame structures is generally a trapezoidal shape;

b. a respective one of said at least two side legs having at least two apertures therethrough;

c. another one of said respective at least two side legs having at least two clips; and d. said each one of said multiplicity of open frame structures interconnected to each other by inserting a respective one of said at least two clips of said respective one of said at least two side legs of one frame structure into a respective one of said at least two apertures of said respective one of said at least two side legs of an adjacent frame structure to form a collar around the animal's neck;

e. whereby when said collar is formed around the animal's neck, said collar thereby substantially prevents the animal from bending its neck to bite or lick an affected area on its body.

40. The collar in accordance with claim 39 wherein said each one of said multiplicity of interlockable open frame structures has an open area for allowing air to flow therethrough, wherein said collar is formed around the animal's neck.

41. The collar in accordance with claim 39 wherein each of said at least two clips of said another one of said respective ne of said at least two side legs of a frame structure has a slot therebetween to divide each clip into a first half and a second half so that said at least two clips are deformable to be inserted into said respective one of said at least two apertures of said respective one of said at least two side legs of said adjacent frame structure.

42. The collar in accordance with claim 39 wherein said each one of said multiplicity of interlockable open frame structures is made of plastic material.

43. The collar in accordance with claim 39 wherein said collar is intended for a dog.

44. The collar in accordance with claim 39 wherein said collar is intended for a cat.

45. The collar in accordance with claim 39 wherein said each open frame structure is aligned in the same direction with its adjacent open frame structure to thereby form a collar which is generally a frusto-conical shape.

46. The collar in accordance with claim 39 wherein said multiplicity of open frame structures are aligned with a respective open frame structure and aligned opposite to its adjacent open frame structure to thereby form a collar which is generally a tubular shape.

47. A collar for an animal, comprising:

a. a multiplicity of interlockable open frame structures, each open frame structure having at least two side legs, a top leg and a bottom leg, the at least two side legs integrally attached to the top and bottom legs, where each open frame structure is aligned in the same direction with its adjacent open frame structure to thereby form a collar which is generally a frusto-conical shape;

b. a respective one of said at least two side legs having at least two apertures therethrough;

c. another one of said respective at least two side legs having at least two clips; and d. said each one of said multiplicity of open frame structures interconnected to each other by inserting a respective one of said at least two clips of said respective one of said at least two side legs of one frame structure into a respective one of said at least two apertures of said respective one of said at least two side legs of an adjacent frame structure to form the collar around the animal's neck;

e. whereby when said collar is formed around the animal's neck, said collar thereby substantially prevents the animal from bending its neck to bite or lick an affected area on its body.

48. The collar in accordance with claim 47 wherein said each one of said multiplicity of interlockable open frame structures provides air to the area wherein said collar is formed around the animal's neck.

49. The collar in accordance with claim 47 wherein each of said at least two clips of said another one of said respective one of said at least two side legs of a frame structure each has a slot therebetween to divide the clip into a first half and a second half so that said at least two clips are deformable to be inserted into said respective one of said at least two apertures of said respective one of said at least two side legs of said adjacent frame structure.

50. The collar in accordance with claim 47 wherein said each one of said multiplicity of interlockable open frame structures is generally a rectangular shape.

51. The collar in accordance with claim 47 wherein said each one of said multiplicity of interlockable open frame structures is generally a trapezoidal shape.

52. The collar in accordance with claim 47 wherein said each one of said multiplicity of interlockable open frame structures is made of plastic material.

53. The collar in accordance with claim 47 wherein said collar is intended for a dog.

54. The collar in accordance with claim 47 wherein said collar is intended for a cat.

55. A collar for an animal, comprising:

a. a multiplicity of interlockable open frame structures, each open frame structure having at least two side legs, a top leg and a bottom leg, the at least two side legs integrally attached to the top and bottom legs, where the open frame structures are aligned with a respective open frame structure and aligned opposite to its adjacent open frame structure to thereby form a collar which is generally a tubular shape;

b. a respective one of said at least two side legs having at least two apertures therethrough;

c. another one of said respective at least two side legs having at least two clips; and d. said each one of said multiplicity of open frame structures interconnected to each other by inserting a respective one of said at least two clips of said respective one of said at least two side legs of one frame structure into a respective one of said at least two apertures of said respective one of said at least two side legs of an adjacent frame structure to form a collar around the animal's neck, wherein each of said at least two clips of said another one of said respective one of said at least two side legs of a frame structure has a slot therebetween to divide each clip into a first half and a second half so that said at least two clips are deformable to be inserted into said respective one of said at least two apertures of said respective one of said at least two side legs of said adjacent frame structure;

e. whereby when said collar is formed around the animal's neck, said collar thereby substantially prevents the animal from bending its neck to bite or lick an affected area on its body.

56. The collar in accordance with claim 55 wherein said each one of said multiplicity of interlockable open frame structures has an open area for allowing air to flow therethrough, wherein said collar is formed around the animal's neck.

57. The collar in accordance with claim 55 wherein said each one of said multiplicity of interlockable open frame structures is generally a rectangular shape.

58. The collar in accordance with claim 55 wherein said each one of said multiplicity of interlockable open frame structures is generally a trapezoidal shape.

59. The collar in accordance with claim 55 wherein said each one of said multiplicity of interlockable open frame structures is made of plastic material.

60. The collar in accordance with claim 55 wherein said collar is intended for a dog.

61. The collar in accordance with claim 55 wherein said collar is intended for a cat.

62. A collar for an animal, comprising:

a. a multiplicity of interlockable open frame structures, each open frame structure having at least two side legs, a top leg and a bottom leg, the at least two side legs integrally attached to the top and bottom legs, where the open frame structures are aligned with a respective open frame structure and aligned opposite to its adjacent open frame structure to thereby form a collar which is generally a tubular shape, each open frame structure having a generally trapezoidal shaped;

b. a respective one of said at least two side legs having at least two apertures therethrough;

c. another one of said respective at least two side legs having at least two clips; and d. said each one of said multiplicity of open frame structures interconnected to each other by inserting a respective one of said at least two clips of said respective one of said at least two side legs of one frame structure into a respective one of said at least two apertures of said respective one of said at least two side legs of an adjacent frame structure to form a collar around the animal's neck;

e. whereby when said collar is formed around the animal's neck, said collar thereby substantially prevents the animal from bending its neck to bite or lick an affected area on its body.

63. The collar in accordance with claim 62 wherein said each one of said multiplicity of interlockable open frame structures has an open area for allowing air to flow therethrough, wherein said collar is formed around the animal's neck.

64. The collar in accordance with claim 62 wherein each of said at least two clips of said another one of said respective one of said at least two side legs of a frame structure has a slot therebetween to divide each clip into a first half and a second half so that said at least two clips are deformable to be inserted into said respective one of said at least two apertures of said respective one of said at least two side legs of said adjacent frame structure.

65. The collar in accordance with claim 62 wherein said each one of said multiplicity of interlockable open frame structures is made of plastic material.

66. The collar in accordance with claim 62 wherein said collar is intended for a dog.

67. The collar in accordance with claim 62 wherein said collar is intended for a cat.

* * * * *